May 23, 1933. G. K. LEWIS 1,910,397
FRAMELESS VEHICLE BODY
Filed May 8, 1931 5 Sheets-Sheet 1

May 23, 1933.  G. K. LEWIS  1,910,397
FRAMELESS VEHICLE BODY
Filed May 8, 1931   5 Sheets-Sheet 4

Witness:
William P. Kilroy

Inventor:
George K. Lewis
By George I. Haight
Atty.

May 23, 1933.  G. K. LEWIS  1,910,397
FRAMELESS VEHICLE BODY
Filed May 8, 1931  5 Sheets-Sheet 5

Witness:
William P. Kilroy

Inventor:
George K. Lewis
By George I. Haight
Atty.

Patented May 23, 1933

1,910,397

UNITED STATES PATENT OFFICE

GEORGE K. LEWIS, OF CHICAGO, ILLINOIS, ASSIGNOR TO CARROLL C. KENDRICK, OF CHICAGO, ILLINOIS

FRAMELESS VEHICLE BODY

Application filed May 8, 1931. Serial No. 535,827.

My invention relates to improvements in vehicle bodies, and more particularly to insulated commercial bodies used for refrigerating purposes.

One of the objects of the invention is to provide a closed vehicle body made up of spaced composite panels of sheet metal and plywood laminations, together with insulating material fabricated therebetween in such manner as to render the walls and roof rigid, substantial and self-sustaining without the use of the usual framework commonly employed in vehicle bodies; thereby eliminating the weight and expense of such framework and the obstruction within the body which such framework would otherwise provide.

A further object is to provide a refrigerator vehicle body wherein the roof structure, although supported entirely by the body walls without the aid of framework, is capable of sustaining excessive weights, such as the lading suspended therefrom during loading and unloading operations.

A further object is to provide an effective insulated structure wherein the walls and roof structure are formed by laminated sheet metal and plywood panels spaced apart with insulating material in said space secured to said panels, whereby a unitary construction having great strength combined with lightness in weight is obtained.

A further object is to simplify the construction of refrigerator vehicle bodies by the provision of a wall structure from which the door opening can be cut to the desired size after the wall structure has been completely fabricated as a whole, and the portion of the wall structure defined by the cut can be used as the door, thereby eliminating the usual pre-arrangement of walls for door openings and framing therefor, and the usual building and fitting of doors separately.

A further object is to provide a simple and effective means for joining the wall structures in angular relation at the corners of the body to make the entire body integrally related as a self-sustaining structure.

Other objects of the invention will appear hereinafter.

Referring to the accompanying drawings which illustrate one embodiment of my invention.

Figure 1:
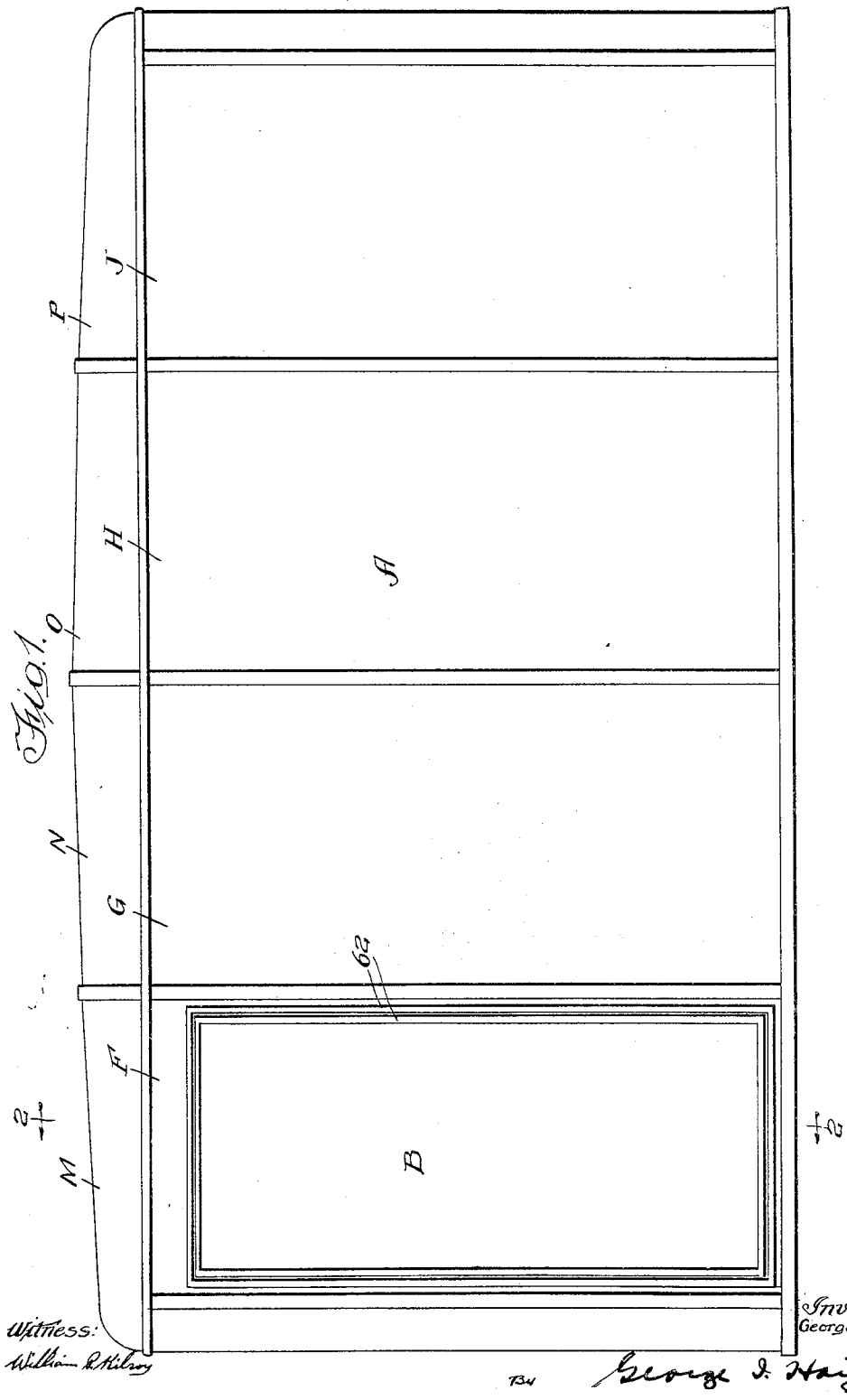
Fig. 1 is a side elevation of a vehicle body in which my invention is embodied, showing a door formed in the side wall thereof.

The vehicle body illustrated in the drawings is designed for the purposes of refrigeration and is of the type which is completely enclosed and provided with an access door or doors. In Fig. 1, the exterior of one of the side walls of this type of body A is shown, with an access door B adjacent its rear end.

In the present structure, the side and end walls and the top and bottom walls are all made up of composite panels of plywood having their exterior faces sheathed by means of a lamination of sheet metal, together with insulating material which is coordinated with the composite panels in a manner to make the walls self-sustaining and exceptionally strong and capable of maintaining their shape, strength and rigidity without the aid of additional framework.

By reference to the enlarged sectional views, it will be seen that each of the walls comprises an inner and an outer panel structure C and D, respectively, the panels being separated to provide space for a body of insulating material E. This insulating material may be of any suitable kind for the purpose, but I prefer to use balsa wood which has very high insulating properties combined with lightness in weight and sufficient inherent strength so that it may be accurately cut and fitted like lumber.

Balsa wood itself, however, is not of sufficient strength to comply with the requirements of vehicle bodies which are subjected to shocks and strains of various kinds, but this strength is supplied by the composite panels which form the inner and outer faces of the wall structure. The panels and balsa wood are combined into a unitary wall structure by a bond of glue or other suitable adhesive applied between the inner faces of the panels and the surfaces of the balsa wood, thus rendering the structure capable of being handled and cut as a single slab.

The composite panels are composed of a plurality of wood or fibre laminations 1 which constitute the body or core of the panel, and a sheet metal layer or lamination 2 on one or both faces of the core, these laminations being bonded together by glue or suitable adhesive and compressed to form unitary panel structures of great strength.

The panels shown in the drawings are sheathed on one side only with sheet metal laminations 2, and these are positioned to form the exterior or exposed faces of the walls so that they provide suitable surfaces capable of withstanding the shocks to which body walls are subjected, and to provide suitable surfaces for finishing purposes. However, the same type of panels with metallic sheathing on both faces thereof may be used, if desired.

Each of the walls of the vehicle body is made up of a plurality of wall sections F, G, H and J, each of which is comprised of the inner and outer composite laminated panels with the body of balsa wood or insulating material therebetween. The sections which make up a wall are preferably abutted edgewise to each other to make up the complete wall structure, and the sections may be joined together in any suitable manner.

Figure 5:
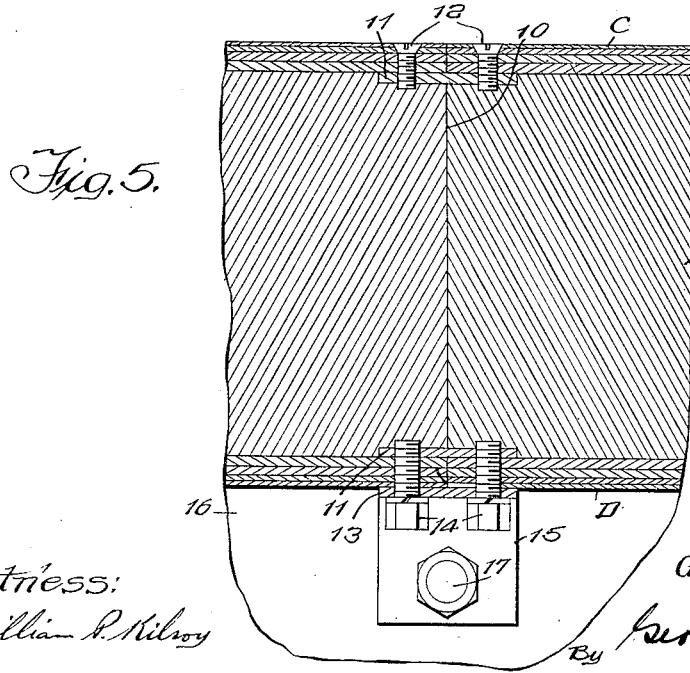
Fig. 5 is an enlarged detail section on the line 5—5 of Fig. 4, showing the manner of joining the wall sections together.

Fig. 5 illustrates two sections of the floor or bottom wall of the body with their edges 10 in abutting relation, and a means for joining these sections in this abutted relation comprises metal joint strips or plates 11, recessed into the face of the insulating material and overlapping the parting line between the two sections. Flat-headed screws 12 are inserted through holes drilled in the panels and are threaded into the joint plate to clamp the joint plate to the panels to firmly hold them together.

In Fig. 5, the lower or bottom panels of the abutting wall sections are also overlapped by a plate 13, and bolts 14 are inserted through holes therein and the panels, and threaded into the inner joint strip 11. In this case, the plates 13 are formed as part of L-shaped brackets 15 which are secured to the stringers 16 of the vehicle frame by means of the bolts 17, so that the body may be securely anchored to the vehicle.

Figure 4:
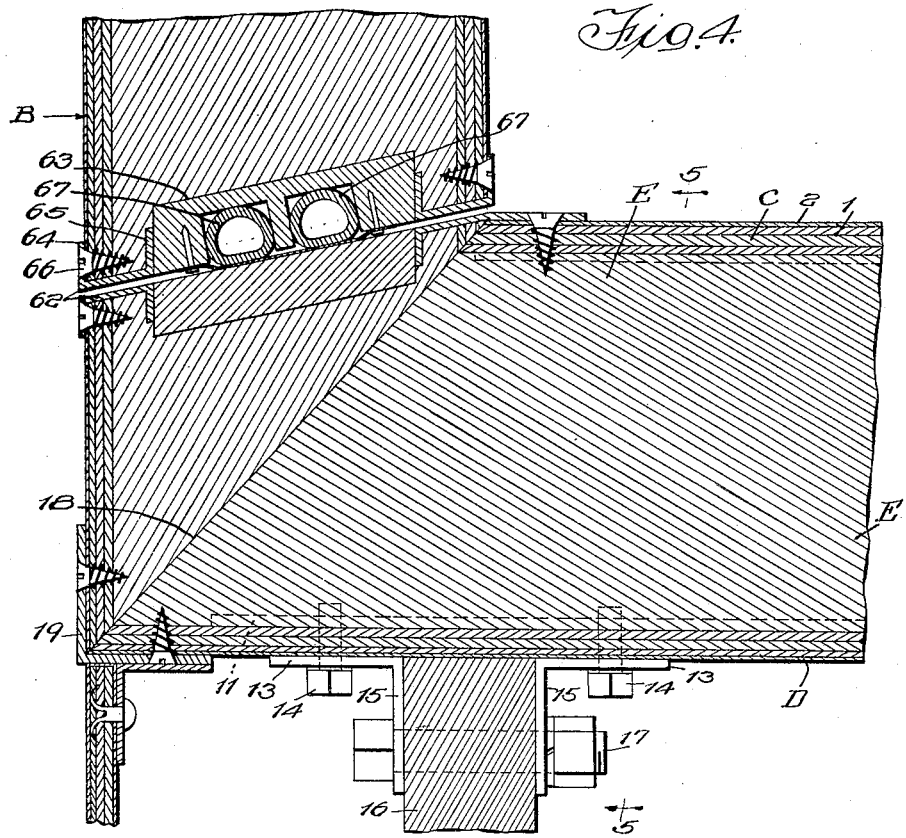
Fig. 4 is an enlarged sectional reproduction of the lower left-hand portion of the structure shown in Fig. 2.
Figure 8:
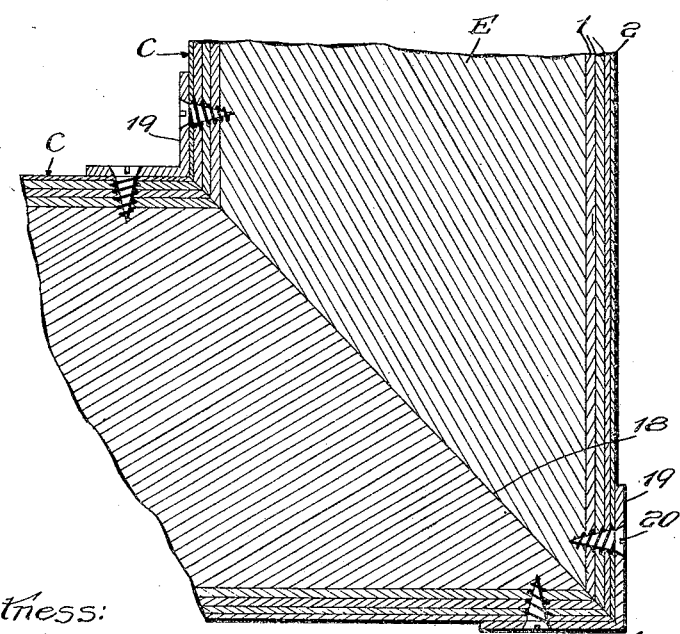
Fig. 8 is an enlarged sectional reproduction of the lower right-hand portion of the structure shown in Fig. 2.

At the corners of the body formed by the angular relation of the walls with respect to each other, the edges of the wall sections are mitered on the diagonal lines 18, as illustrated in Figs. 4 and 8, and exterior angle members 19 are employed for joining the wall sections. The angle members 19 are disposed in the corners on the exposed faces of both the inner and outer composite panels and are joined to the panels by the flat-headed screws 20 which extend through the panels. The screws used for this purpose are a special type similar to wood screws, but they are formed with very deep threads which cut their own threads in the material of the panel as they are screwed into place. They have exceptional holding power and securely hold the parts together. They eliminate the necessity of drilling and threading holes separately. The angles 19 seal the joints against the entrance of moisture to the interior of the wall or the panels.

The top wall structure, like the bottom and vertical walls, is composed of the inner and outer composite laminated panels C and D, spaced apart, with the space filled with balsa wood insulating material E. This top wall is also composed of a plurality of sections which extend transversely of the body and are butt-jointed together at their edges by means of joint strips in the same manner as hereinbefore described in connection with Fig. 5.

Figure 3:
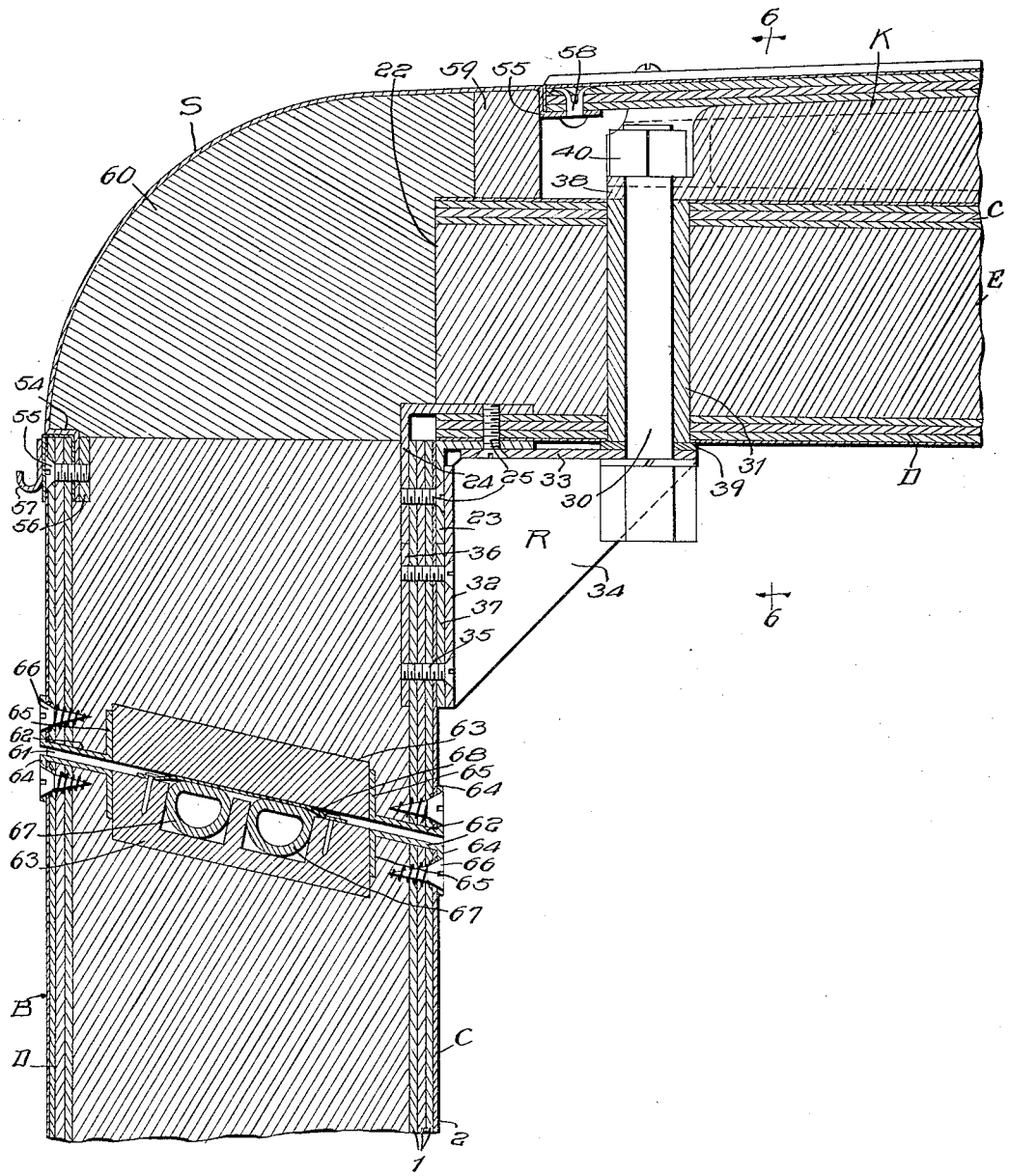
Fig. 3 is an enlarged sectional reproduction of the upper left-hand portion of the structure shown in Fig. 2.

The ends 22 of the top wall sections, as more clearly shown in Fig. 3, terminate substantially in the plane of the inner faces of the vertical side walls, and the adjoining inner composite panels D of the top and side walls are secured by the inner and outer angle members 23 and 24 which fit the corners and clamp the panels therebetween by means of the flat-headed screws 25.

The normal roof of the body is positioned above the top insulated wall and is supported by a plurality of roof bows K which are disposed transversely of the body at intervals throughout its length. The roof is formed by composite panels similar to the panels C and D, hereinbefore described. The panels are arranged in sections which preferably coincide with the roof bow so that the joints between these sections will be formed at the bows.

Figure 6:
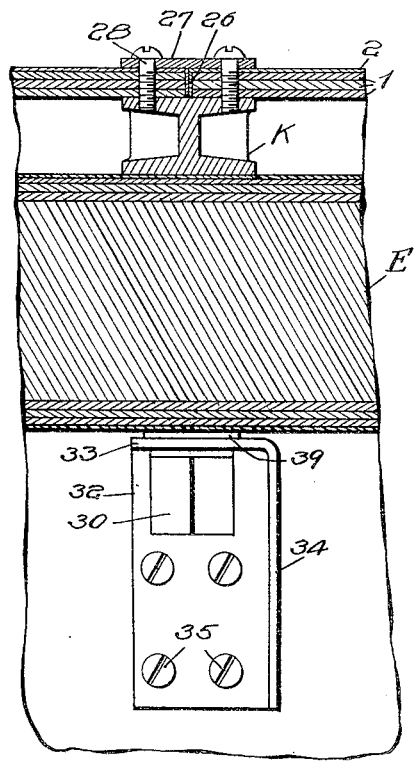
Fig. 6 is a vertical detail section on the line 6—6 of Fig. 3.
Figure 7:
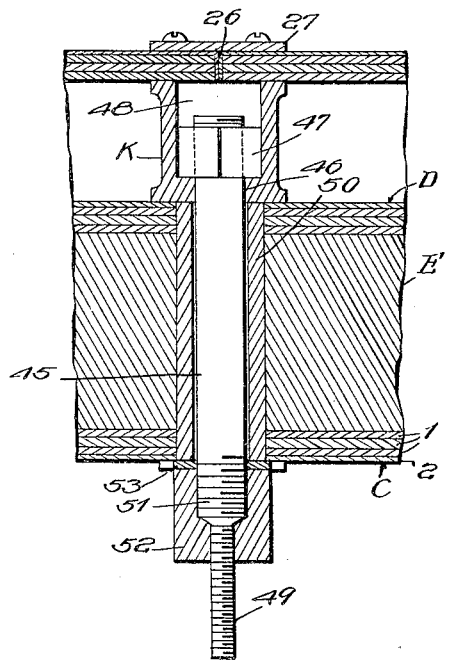
Fig. 7 is an enlarged detail vertical section on the line 7—7 of Fig. 2.

As illustrated in Figs. 6 and 7, the exterior sheet metal laminations of the roof panels at these abutting edges are turned inwardly as at 26, to overlie the edges of the body of the panels, and these in-turned edge portions are abutted together. A joint strip 27 overlaps the joint thus formed and clamps the panels against the roof bows by means of the screws 28 which extend through the panels and are threaded into the flanges of the bows. If desired, the joint thus formed may be finished off by means of the usual molding strips.

The roof bows, as shown in Fig. 6, are preferably made of castings and are formed I-shaped in section. They are properly proportioned for strength and are tapered in depth from the central portion toward the ends. At their ends, they are supported from the vertical side walls of the body through the medium of the bolts 30, sleeves 31, and the brackets R (Fig. 3).

The brackets, as shown in Figs. 3 and 6, have vertical flanges 32 and horizontal flanges 33 which are connected by the angular wall 34 to form a rigid supporting structure. The vertical flanges 32 are secured to the inner composite panels of the side walls by means of the screws 35 which extend through the bracket flanges and the panel and are threaded into a plate 36. A filler plate 37 is interposed between the flanges and the panel to provide a surface for the flange of the bracket flush with the angle corner member 23. The screw 25, which holds the angle corner members 23 and 24, is also used for clamping the flange 33 of the bracket to the top wall to tie these parts firmly together.

Since the bows are above the top wall of the roof and the brackets are below this wall, the sleeves 31 are provided to carry the support of the brackets to the bows. As shown more clearly in Fig. 3, the ends 38 of the lower flanges of the bows rest upon the upper end of the sleeve 31. The lower end of the sleeve rests upon the horizontal flange 33 of the bracket. The supporting sleeve 31 is preferably made of insulating material and an insulating washer 39 is interposed between the lower end of this sleeve and metal bracket to prevent the transmission of heat through the wall around this structure. The bolt 30 is inserted upwardly from below through the bracket flange, sleeve and end 38 of the roof bow, and is provided with a nut 40 which clamps all of these parts together in rigid relation.

In vehicle bodies of this character, the lading is often handled into and out of the body by suspending it from the roof of the body, either on individual hangers or by arranging it to travel on overhead rails. In order to make provision for this method of handling the lading, a number of hangers are distributed throughout the area of the roof, as shown more clearly by reference to Figs. 2 and 7. A number of bolts 45 are suspended at regular intervals from the roof bows. These bolts extend through openings 46 in the underside of the roof bows and are provided with nuts 47 at their upper ends which are disposed in suitable sockets 48 formed in the bows.

The hanger bolts extend downwardly through openings in the insulated top wall of the body and their lower ends 49 are reduced somewhat in diameter and threaded to provide means for attaching rails or any suitable type of hanger thereto. These hanger bolts are surrounded by sleeves 50 of insulating material which serve to insulate the bolts. The hanger bolts are threaded at 51 to receive clamping nuts 52 for clamping the sleeves against the undersurface of the roof bows. The insulating sleeves 50 are substantially equal in length to the overall thickness of the top wall and a washer 53 is interposed between the clamping nuts 52 and the lower end of the sleeve and bears against the wall structure so that the hanger bolts also support the top wall from the roof bows.

The roof rail S is preferably formed of a single sheet of metal curved transversely to meet the edges of the roof and side walls. The longitudinal edge portions 54 and 55 of this roof rail are offset, as shown more clearly in Fig. 3, to form channels or recesses for the reception of the outer composite panels of the side walls and roof panels. These channels or recesses are substantially the same depth as the thickness of the panel, so that the outer surface of the panel is substantially flush with the surface of the roof rail. The side wall panels are secured in this recess by the flatheaded bolts 55 which extend through the panels and are threaded into a clamping strip 56 on the inner face of the panel, the heads of the screws being countersunk to make them flush with the surface of the panel. A gutter 57 is also provided along this joint and is secured thereto by welding or in any suitable manner. The edge of the roof panel fits into the roof rail recess in like manner, but is fastened therein by means of split rivets 58 instead of screws or bolts. The roof rail is supported at this point by means of a spacer block 59 which is interposed between the roof rail and the upper panel of the top wall. The space formed in the corners enclosed by the roof rail is also preferably filled with balsa wood 60 or other suitable insulating material.

In accordance with standard practice, it is customary to form door openings in the walls as the walls are being built up, and to build up separate doors which are fitted within these openings. Great care must be exercised in making the door openings and the framing therefor accurate, and to build the doors accordingly. This greatly increases the expense of building vehicle bodies.

In accordance with my invention, I form the complete wall as a unit, without reference to any provision for doors, and then form the doors from the wall itself by cutting out a section of the desired dimensions from the previously completed wall. This method makes it possible to provide door openings of any size and in any position within the area of the wall, for the reason that the wall is, in effect, continuous throughout its entire area and is not obstructed by separate body framework of any character. Having selected the location of the door, dimensions thereof are marked off on the wall and a sawcut made through the entire thickness of the wall on the lines so marked. The act of cutting through the wall thus in one operation provides the door opening and at the same time the piece cut therefrom constitutes the door itself.

Figure 2:
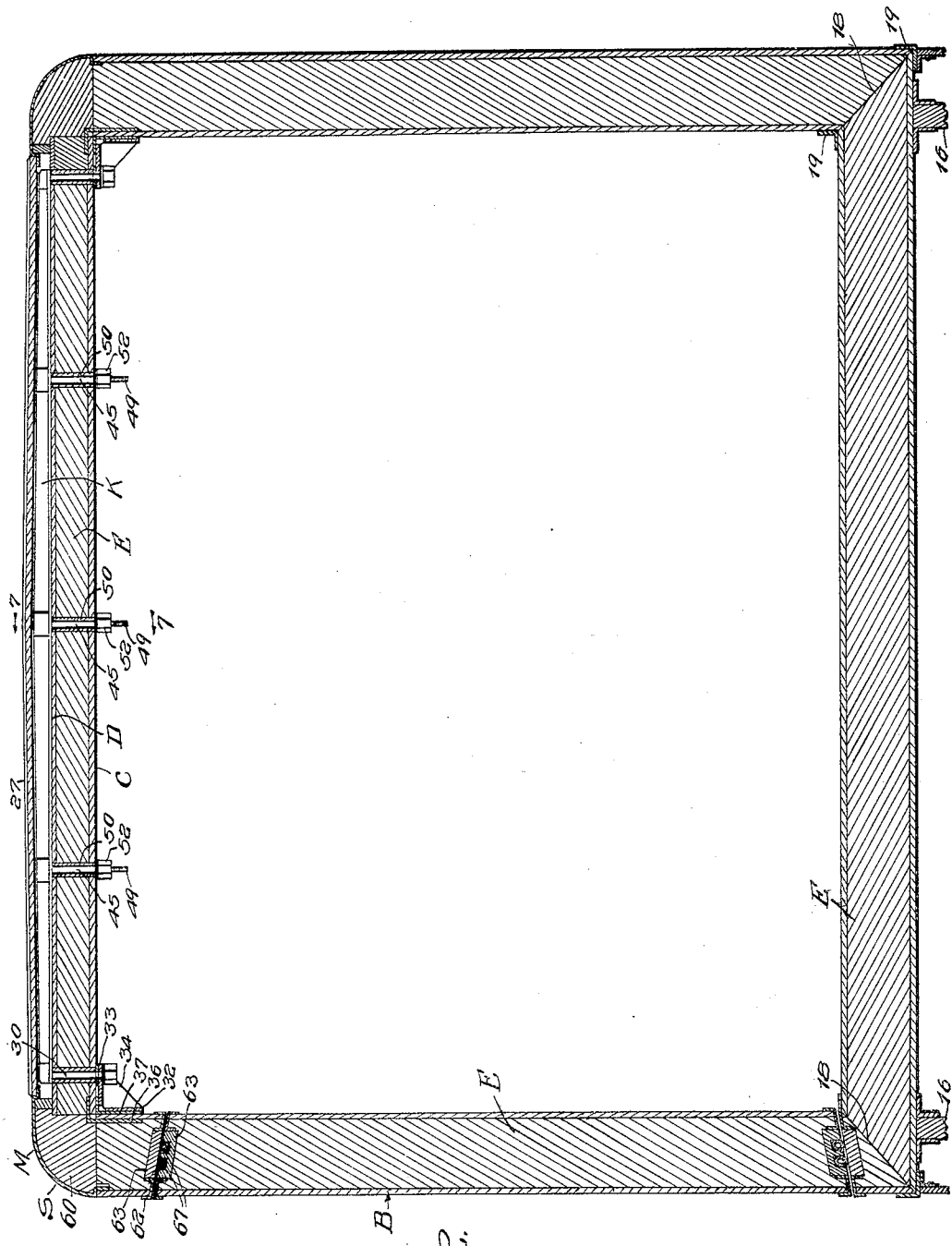
Fig. 2 is a transverse vertical sectional view on the line 2—2 of Fig. 1.

As shown more clearly in Figs. 2, 3 and 4, the cut 61 is made on the bevel, or in angular relation to the plane of the wall, so that as the door B is closed it tends to wedge into the opening. After the cut 61 has been made in the wall and the door section released therefrom, the edges of the wall which define the opening and the marginal edges of the door section thus formed are finished off by means of the U-shaped strips 62 and the inserts 63. The edge faces of the door opening and of the door are channeled out to provide space for the inserts 63. These inserts 63 are preferably of a stronger wood than the balsa wood which constitutes the insulating material of the wall structure. The purpose of these inserts is to protect the edges of the door and opening.

The inserts 63 are of sufficient width to occupy most of the thickness of the balsa wood insulating material, and the remaining portions of the balsa wood insulating material, as well as the edges of the composite panels, are protected by the U-shaped edging strips 62. These edging strips, as shown in Fig. 3, are disposed with one of their legs 64 overlying the exterior metal lamination of the composite panel, and with their other leg 65 extending edgewise into the insulating material at the edges of the inserts. These edging strips are secured in place by means of tapered deep-threaded screws 66 previously described.

The inserts 63 in the edge of the door are provided with tubular flexible gaskets 67 arranged in suitable recesses in the insert 63 and adapted to project beyond the face of said inserts so that when the door is closed they will be compressed against the face of the opposite insert and thereby form an effective seal for the doors. In the present structure, there are two of these gaskets side by side, extending around the periphery of the door and a flexible metal strip 68 covers these gaskets for the purpose of protecting the gaskets against wear or damage. The strip flexes with the gasket and thereby adapts itself to the pressure on the gaskets when the door is closed.

While I have herein shown and described what I consider the preferred manner of carrying out my invention the same is merely illustrative and I contemplate any changes or modifications that may come within the scope of the claims appended hereto.

I claim:

1. In a frameless vehicle body, the combination of vertical walls, a top wall comprising composite panels of plywood and sheet metal laminations, with the sheet metal exposed, said panels being spaced apart to define the thickness of the wall and having in said space a body of insulating material, brackets secured to said vertical walls, roof bows above the top wall extending from side to side of the body and supported at their ends on said brackets, and means carried by said bows and extending through said top wall for suspending the said top wall from the under side thereof.

2. In a frameless vehicle body, the combination of vertical walls, a top wall comprising a pair of composite panels of plywood and sheet metal laminations, with the sheet metal exposed, said panels being spaced apart to define the thickness of the wall and having in said space a body of insulating material, instanding brackets secured to and supported by said vertical walls, roof bows above the top wall extending from side to side of the body and supported by the said brackets, a roof member mounted above and supported by said roof bows, and means connected with said roof bows and extending through said top wall for supporting the said top wall from the under side thereof and beneath said bows.

3. In a frameless vehicle body, the combination of vertical walls, a top wall comprising composite panels of plywood and sheet metal laminations, with the sheet metal exposed, said panels being spaced apart to define the thickness of the wall and having in said space a body of insulating material, brackets secured to said vertical walls, roof bows above the top wall extending from side to side of the body and supported at their ends by said brackets, a roof member mounted upon and supported by said roof bows, and suspension members secured to said bows intermediate the ends of the bows and extending through said top wall and engaging the inner side thereof for supporting the top wall.

4. In a refrigerator vehicle body, the combination of side walls, a top wall comprising inner and outer composite panels spaced apart and a body of insulating material therebetween, said panels comprising plywood and sheet metal laminations with the sheet metal exposed, brackets secured to said side and top walls for joining said top wall to the side walls, a plurality of roof bows extending between said side walls above the top wall and supported at their ends on said brackets, and means carried by said roof bows intermediate their ends for supporting the top wall, said means comprising hanger bolts extending through said top wall to the interior of the body and having insulating sleeves surrounding said bolts.

5. In a frameless refrigerator vehicle body of the class described, the combination of vertical side walls, a horizontal top wall, comprising a body of insulating material having composite panels on its inner and outer faces, said panels each comprising laminations of plywood and sheet metal with the sheet metal exposed, angular corner pieces for joining the inner panel of the top wall to said side walls, supporting brackets secured to said side walls below the top wall, roof bows disposed above the top wall having means suspending said top wall from the under side thereof, and means extending upwardly through said top wall from said brackets to support the rib bows at the ends thereof.

6. In a frameless vehicle body, the combination of vertical side walls, roof bows extending transversely of the body from one side wall to the other, instanding brackets secured to said side walls, a top wall secured at its ends on said brackets and comprising a pair of composite panels spaced apart and a body of insulating material therebetween and disposed beneath said bows, bolts depending from said bows intermediate the ends thereof and extending through said top wall panels and insulating material, clamping members on said bolts for clamping the top wall against the under side of said bows, and posts upstanding from said brackets through said top wall and supporting the ends of the bows.

7. In a frameless refrigerator vehicle body, the combination of vertical side walls having instanding brackets secured thereto adjacent the upper edges thereof, a transverse roof bow extending between the side walls, posts upstanding from said brackets and secured to the ends of said bow for supporting the bow above said brackets, a composite top wall, a body of insulating material sheathed on both sides by composite panels, positioned between said brackets and said bow and supported at its edges by the brackets, hanger bolts depending from said bow intermediate the ends thereof and extending downwardly through said top wall to the under side thereof, and nut members threaded on the ends of said bolts and bearing against the under side of said top wall for clamping the top wall against the bow.

GEORGE K. LEWIS.